United States Patent [19]
Pecht et al.

[11] Patent Number: 5,090,712
[45] Date of Patent: Feb. 25, 1992

[54] NON-CONTACTING, GAP-TYPE SEAL HAVING A RING WITH A PATTERNED MICRODAM SEAL FACE

[75] Inventors: Glenn G. Pecht, Wheeling; Jon Hamaker, Schaumburg, both of Ill.

[73] Assignee: John Crane Inc., Morton Grove, Ill.

[21] Appl. No.: 553,397

[22] Filed: Jul. 17, 1990

[51] Int. Cl.⁵ .................. F16J 15/34; F16C 17/04
[52] U.S. Cl. ..................... 277/96.1; 384/123
[58] Field of Search ............... 277/81 R, 96, 96.1, 277/134; 384/123

[56] References Cited

U.S. PATENT DOCUMENTS

| | | | |
|---|---|---|---|
| 3,572,730 | 3/1971 | Otto | 277/96.1 |
| 3,586,340 | 6/1971 | Otto | 277/96 |
| 3,638,957 | 2/1972 | Marsi . | |
| 3,744,805 | 7/1973 | Heinrich | 277/96.1 |
| 3,804,424 | 4/1974 | Gardner | 277/96.1 X |
| 3,973,781 | 8/1976 | Grörich | 277/96.1 X |
| 4,212,475 | 7/1980 | Sedy | 277/96.1 |
| 4,290,611 | 9/1981 | Sedy | 277/134 X |
| 4,420,162 | 12/1983 | Yanai et al. | 277/96.1 |
| 4,423,879 | 1/1984 | Takenaka et al. | 277/96.1 |
| 4,789,250 | 9/1988 | Schluter . | |

FOREIGN PATENT DOCUMENTS

| | | | |
|---|---|---|---|
| 660610 | 4/1963 | Canada | 277/96 |
| 0207580 | 12/1983 | Japan . | |
| 2197396 | 5/1988 | United Kingdom . | |

OTHER PUBLICATIONS

"A New Self-Aligning Mechanism for the Spiral-Groove Gas Seal Stability": by Josef Sedy, ASME paper presented Oct. 1979.

*Primary Examiner*—William A. Cuchlinski, Jr.
*Assistant Examiner*—Scott W. Cummings
*Attorney, Agent, or Firm*—Kinzer, Plyer, Dorn, McEachran & Jambor

[57] ABSTRACT

A seal face of a ring used in a non-contacting, gap-type seal having an annular groove area with microdams, each having a preferable width of about 0.025 inches, between a plurality of groove surface areas. The microdams provide a boundary to the groove surface areas whereby the recess of each groove surface area bounded by the microdams acts as a unitary pressure zone and the pressure in the separate zones decreases in a series of steps as measured from one circumference of the ring to the other circumference.

43 Claims, 3 Drawing Sheets

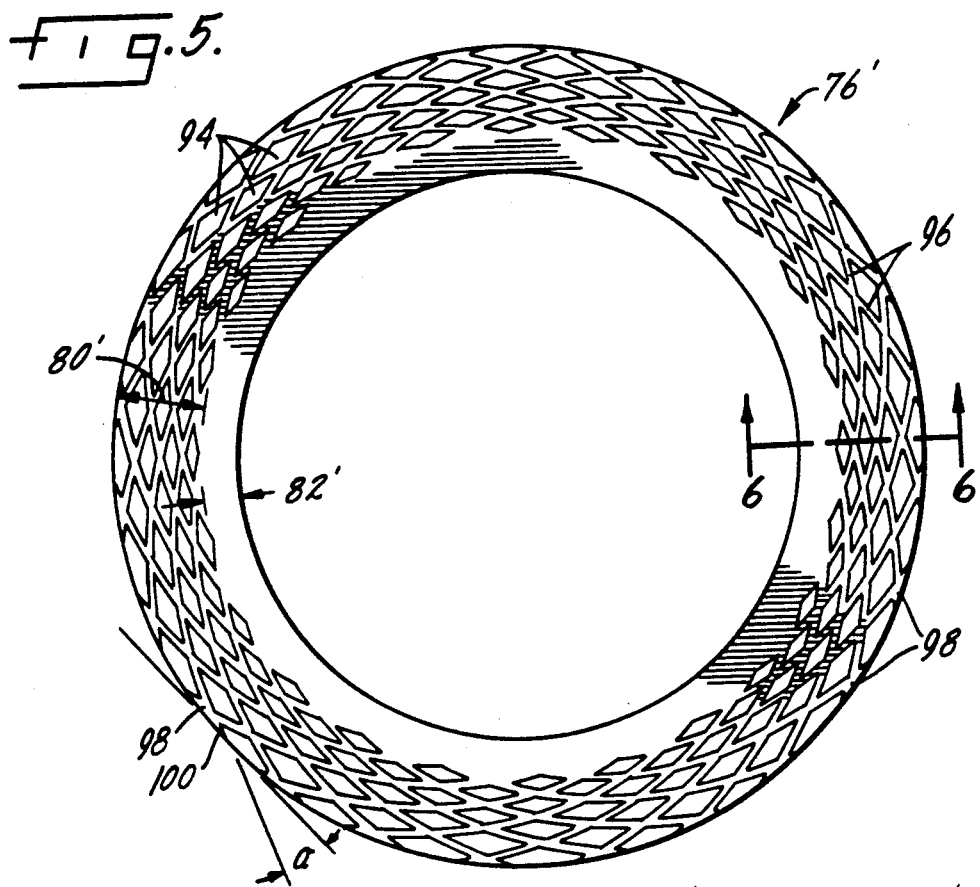
Fig. 5.
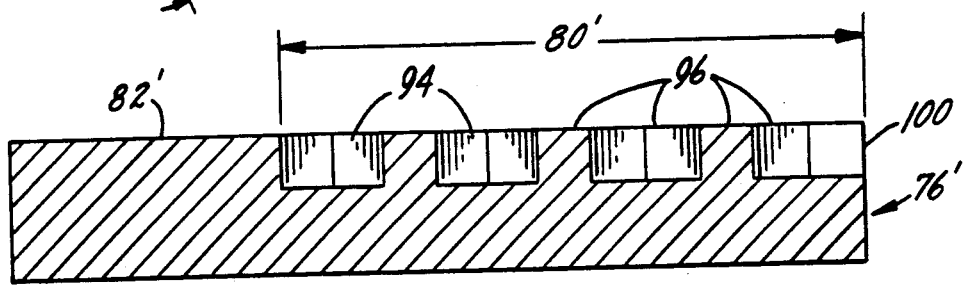
Fig. 6A.
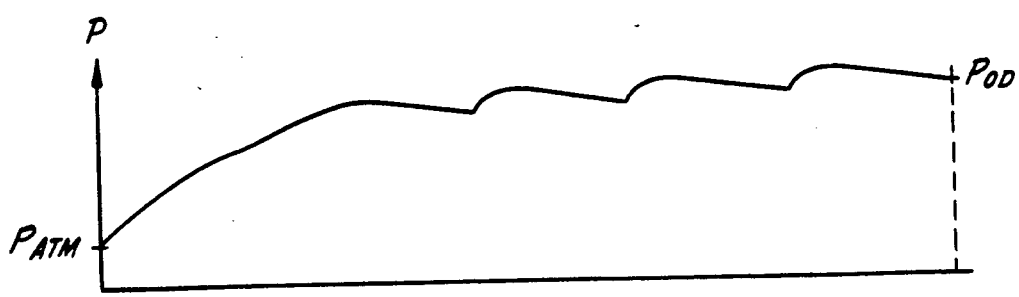
Fig. 6B. PRESSURE PROFILE

5,090,712

NON-CONTACTING, GAP-TYPE SEAL HAVING A RING WITH A PATTERNED MICRODAM SEAL FACE

BACKGROUND OF THE INVENTION

This invention relates generally to mechanical face seals for sealing the space between a rotating shaft and its housing and in particular to face seals having grooves in their sealing surfaces for maintaining a gap between the relatively rotating sealing members.

Spiral groove mechanical face seals are used to create a non-contacting seal between a rotating shaft and its housing. A gap between two sealing faces, one of which is rotating with regard to the other, is maintained by a film of pressurized fluid pumped between the faces by spiral grooves in at least one of the sealing faces. Examples of spiral groove face seals are found in U.S. Pat. No. 3,804,424 issued to Gardner and U.S. Pat. Nos. 4,212,475 and 4,290,611 issued to Sedy. All of these patents are commonly assigned to the assignee of the present invention.

The spiral groove face seals described in these patents and generally those in present use include an annular primary sealing ring having a radially extending face in sealing relation with the radially extending face of an annular mating ring. In operation, either the primary ring or the mating ring rotates with the shaft and includes a radial face in sealing relation to the radial face of the other ring which is itself sealed against the housing. In conventional contacting seals, friction between the two faces during relative rotation produces heat, causing seal face deformation, accelerated aging of the seal components and other undesirable conditions.

It has been found that a very narrow gap or space between the radial faces permits some of the sealed fluid to leak or flow to the low pressure side and that the fluid flow prevents unwanted heat generation. Such a gap is obtained by a series of spiral grooves in the face of either the primary or mating ring which, upon rotation of one of the rings, act as a pump to force fluid between the seal faces. The fluid flow separates the faces and acts as a lubricant, maintaining the gap and allowing the faces to slide against one another without contact between them.

Other mechanical face seals utilizing grooved surfaces have been proposed. For example, U.S. Pat. No. 4,420,162 describes a face seal having spiral grooves extending from the inner circumference to the outer circumference that are both forwardly and rearwardly inclined with respect to the direction of rotation of the seal face. One set of either forwardly or rearwardly inclined grooves acts to pump the sealed fluid out of the gap between seal faces while the oppositely inclined set of grooves acts to pump fluid into the gap.

These seal face designs, however, do not provide the ideal sealing structure. The seal face spiral groove structure described in U.S. Pat. No. 4,420,162 pumps fluid through the seal in a contacting seal face environment.

Seal faces pumping fluid in only one direction provide a fluid film thickness between the faces that is excessive and results in unwanted and unnecessary leakage. The leakage is somewhat reduced if there is a sealing dam adjacent either the inner or outer diameter of a sealing ring. A dam is an ungrooved annular surface adjacent to the grooved annular surface Moreover, the asymmetry in the spiral direction of the prior art seal faces permit their rotation in only one direction so as to produce their intended gap creating function. Rotation of the shaft in the opposite direction or improper installation of the sealing rings creates a vacuum instead of a gap, and operation of the equipment can seriously damage one or both of the seal faces.

As is recognized by Sedy in U.S. Pat. No. 4,212,475, it is desirable to make the fluid film thickness as small as possible to reduce leakage while simultaneously increasing the film stiffness and thus providing stability to the seal faces and gap dimension. The solution proposed by Sedy provides for specific parameters in the length, width and thickness of the grooves relative to the dimensions of the lands and the dam. This solution works well enough when fluid leakage is not a problem, but will nevertheless produce more excess leakage than is necessary.

SUMMARY OF THE INVENTION

One object of the present invention is to provide for a raised pattern configuration on a seal face which minimizes fluid leakage through the gap between the faces of a mechanical face seal.

Another object of the present invention is to provide a raised pattern configuration capable of providing a gap between the sealing faces of a mechanical end face seal without reference to the direction of rotation of the shaft and rotating ring.

Another object of the present invention is to provide a raised pattern configuration which is capable of providing a thin fluid film having a high stiffness without requiring external liquid lubrication.

Still another object of the present invention is to provide a non-contacting non-wearing seal which pumps fluid across the sealing faces and which provides for a thin fluid film gap and for minimal fluid leakage.

Another object and an important feature of the present invention is a static and a dynamic mechanical face seal which provides a minimum of leakage of fluid across the sealing faces under both static and dynamic conditions.

Accordingly, there is provided in a mechanical face seal, a sealing face in at least one of either the primary or mating rings, the sealing face including a raised pattern portion having discontinuous grooves extending inwardly from one circumference of the face, where the discontinuities are defined by a series of raised surfaces extending around the periphery of the grooved portions and forming narrow dams, known as microdams, so that each discontinuous groove is comprised of a plurality of grooved polygonal surfaces disposed in the face of a ring adjacent to each other and separated by microdams. The discontinuous grooves may be either rearwardly directed, relative to the intended shaft rotation, or may be both rearwardly and forwardly directed to provide for bi-directional rotation of the shaft.

Also disclosed is a series of circumferentially disposed entrance lands defined by having one edge of each entrance land coinciding with the circumferential edge of the circumference of the seal ring face, a radially extending edge of each entrance land being forwardly inclined and another radially extending edge being rearwardly inclined relative to the direction of rotation of the seal ring. The forwardly and rearwardly inclined edges each define an intersecting angle with the circumferential edge of said seal ring relative to a tangent, each intersecting angle being of from about 10 degrees to about 30 degrees. The interesecting angle of each radially extending edge, which is forwardly inclined relative to the rotation of the shaft of each entrance land provides an entrance effect to said seal ring face upon shaft rotation in either direction.

Alternatively or in conjunction, polygonal land areas are disposed between successive discontinuous grooves, the lands providing a fluid barrier to egress of the fluid which is impelled inwardly from the circumference of the seal face by the entrance effect of the entrance lands or the microdam surfaces.

BRIEF DESCRIPTION OF THE DRAWINGS

FIG. 5 is an end view of an alternate embodiment of sealing ring having a raised pattern configuration according to the present invention;

FIG. 6A is an expanded cross-sectional view of the sealing ring embodiment illustrated in FIG. 5 taken along a line approximately at VI—VI; and FIG. 6B is an approximate plot of the pressure profile of the raised pattern of FIG. 6A following approximately similar dimensions along the X-axis.

DETAILED DESCRIPTION OF THE PREFERRED EMBODIMENT

Figure 1:
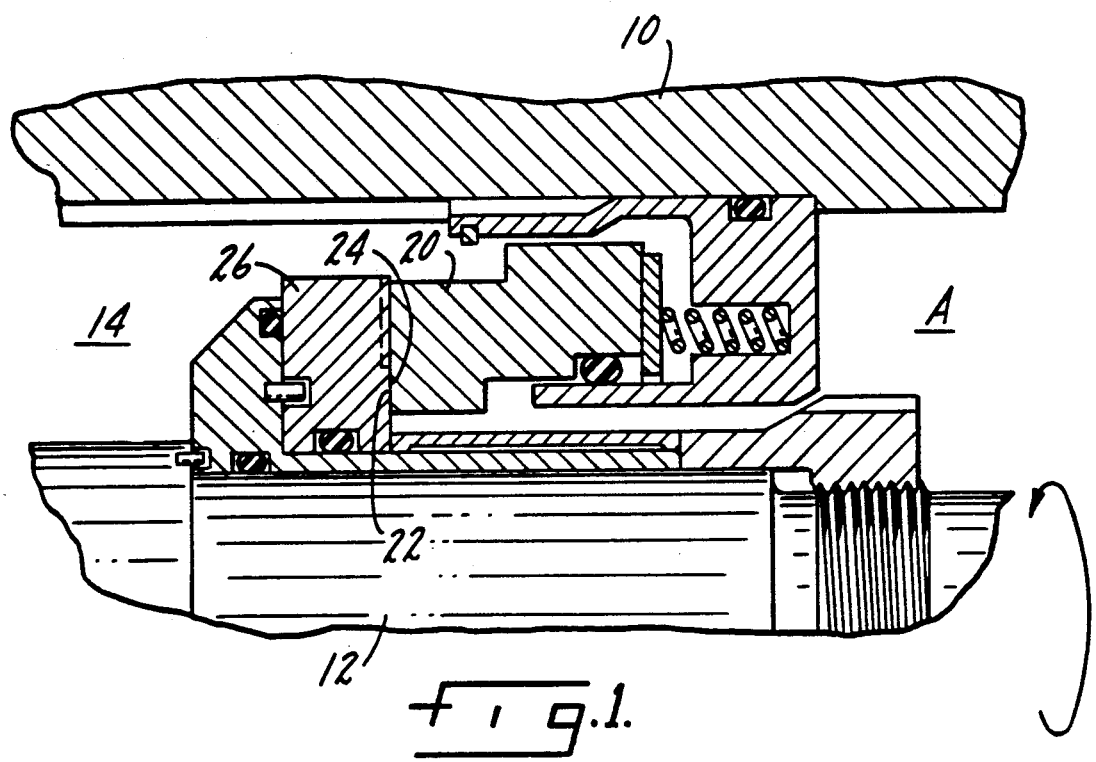
FIG. 1 is a side elevation view in section of a mechanical face seal used in accordance with the present invention.

The environment in which the present invention will be used is depicted in FIG. 1. This environment includes the housing 10 of a compressor (not shown) and a rotating shaft 12 extending through the housing.

The mechanical face seal according to the present invention is used to seal high pressure within the space 14 against leakage to the atmosphere A.

The basic components of the invention include an annular primary sealing ring 20 having a radially extending face 22 in sealing relation with the radially extending face 24 of an annular mating ring 26.

Details of the structure and operation will be discussed as they relate to the present invention, and reference to U.S. Pat. No 4,212,475 is recommended for further discussion of mechanical groove seals in general.

In operation, the mating ring 26 rotates with the shaft with its radial face 24 being in sealing relation to the radial face 22 of primary ring 20. Friction between these faces upon relative rotation produces heat. To avoid undue heat generation, the seal operates as a gap type seal, e.g. with a very narrow gap or space between the radial faces 22 and 24 to permit leakage or flow from the space to the lower pressure side.

Figure 2:
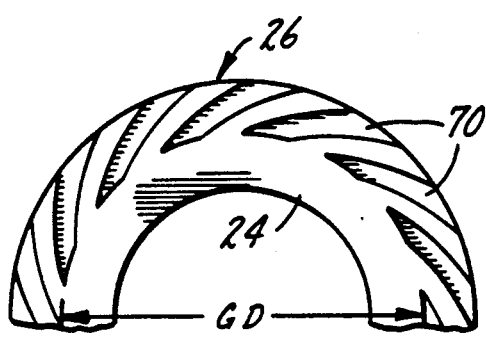
FIG. 2 is an end view of a sealing ring having a conventional spiral groove pattern.

Referring now to FIG. 2, an end view of the sealing face of a conventional ring is illustrated. The particular elements shown in FIG. 2 provide a means for maintaining a gap between the sealing faces of the rings 20 and 26. As is well known in the art, this gap is obtained by forming grooves 70 in the face of either the primary or mating ring. Upon rotation, these grooves act as a pump to force fluid into the gap between the seal faces. The fluid separates the faces to permit the desired leakage. Many of the groove patterns presently used have a spiral design and the seals are therefore known as spiral groove mechanical face seals. The general design considerations for a conventional spiral groove gap type seal are well known.

The stability of the seal faces depends to a great degree in maintaining a parallel relation between the seal faces relative to each other, as is described in U.S. Pat. No. 4,212,475. Seal stability is in part related to the stiffness of the fluid film between the faces. In the case of spiral groove seals, the stiffness and, therefore, stability increase with decreasing fluid film thickness. It is, therefore, desirable to make film thickness as small as possible. This can be done simply by increasing the seal balance. However, pressure and temperature deflections distort the planar quality of the sealing faces and increase the danger of face contact, face damage, and possible seal destruction. Following the teaching of the present invention, these pressure and temperature deflections are minimized by the unique pattern design of a seal face which is capable of maintaining a very thin but highly stable fluid film thickness which nevertheless maintains the parallelity of the sealing faces.

In the conventional embodiment described in U.S. Pat. No. 4,212,475, a self-aligning feature of that invention obtained parallelity of the seal faces by the dimensioning of three seal parameters within specified ranges. These parameters are (1) depth of the grooves; (2) seal balance; and (3) dam width. For a complete description of the optimum ranges of these parameters, reference to U.S. Pat. No. 4,212,475 is once again recommended.

The three parameters described in detail in U.S. Pat. No. 4,212,475 are not exhaustive of the elements and parameters which affect the seal gap, seal gap thickness and seal gap stability. There are approximately 70 parameters which affect the function of a mechanical face seal, and modification of any one of them will necessarily cause a change in the operation of the seal and seal gap. The present invention is directed to a modification of the grooves in the sealing face of one of the rings which provides narrower and more stable seal gaps while yet at the same time maintaining the separation between the sealing faces and preventing contact between them.

Figure 3:
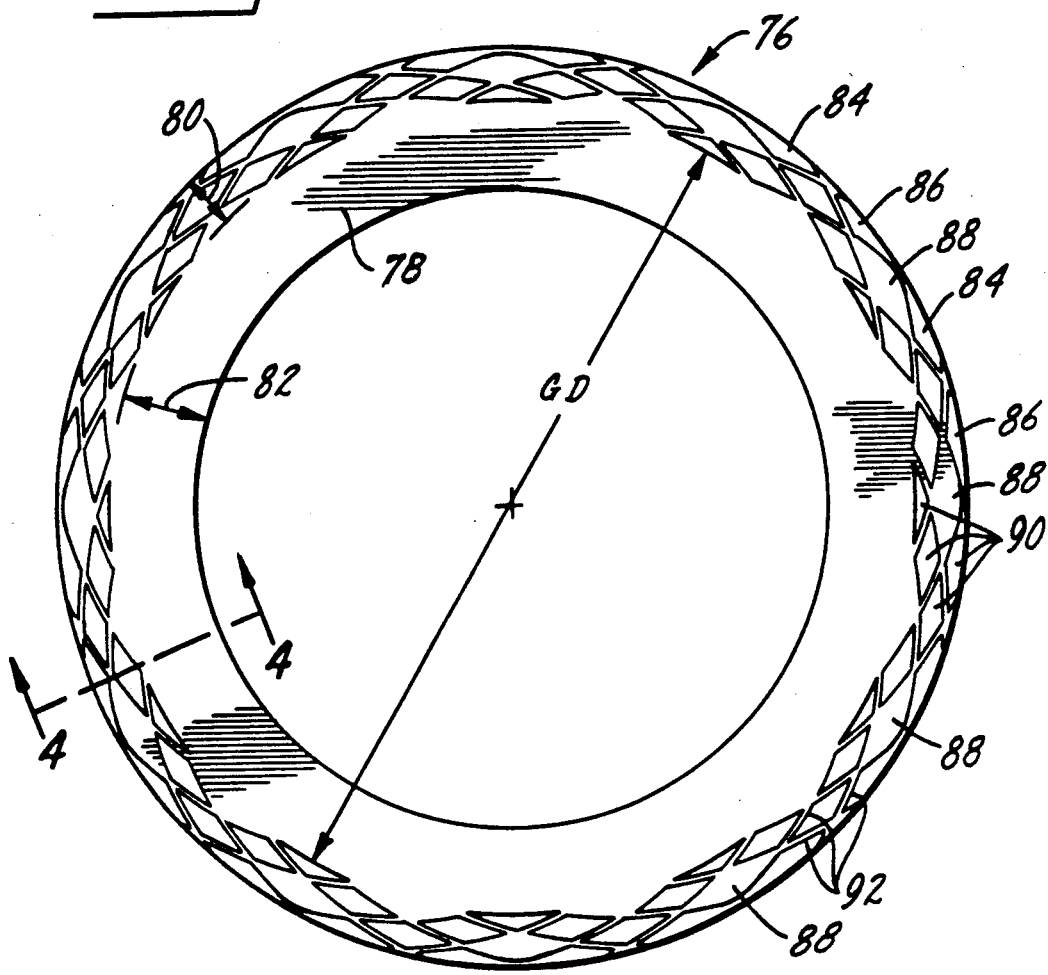
FIG. 3 is an end view of a sealing ring having a raised patter configuration according to the present invention.
Figure 4:
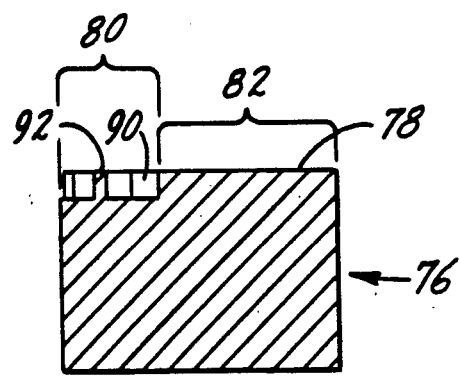
FIG. 4 is a cross-sectional view of the sealing ring illustrated in FIG. 3 taken along a line approximately at IV—IV.

Referring now to FIGS. 3 and 4, there is illustrated a sealing ring 76 including a sealing face 78 utilizing the teachings of the present invention. Like the prior art sealing face 24 shown in FIG. 2, sealing face 78 comprises a groove portion 80 and a dam portion 82. The dam portion 82 is substantially the same as the dam portion shown in FIG. 2, and is bounded by a circle having a diameter GD defining the boundary between the groove portion 80 and the dam portion 82.

The groove portion 80, however, has several differences in relation to the groove portion of ring 26. These differences are significant features of the present invention and directly provide the advantages mentioned above.

One significant difference is that ring 26 provides grooves 70 which are asymmetrical relative to the circumferential direction of the sealing face. That is, groove portion 80 of seal ring 76 includes a set of forwardly directed grooves 84 as well as a set of rearwardly directed grooves 86, each separated by land areas 88. The two sets of grooves 84,86 intersect at discrete polygons 90 which define areas of the surface of groove portion 80, and each of the polygons 90 comprising these areas of intersection are bounded by microdams 92.

The microdams 92 can be any width commensurate with the requirement that each groove be capable of maintaining a fluid interface between the faces of the seal rings. A preferred width of the microdams 92 is approximately 0.025 inches for a seal adapted for use with a shaft having a diameter of 4 inches. The height of the microdams 92 relative to the race of seal ring 76 is preferably the same height as the dam portion 82 and the land areas 88, as is shown in FIG. 4. All the ungrooved surfaces, i.e. the dam portion 82, the land areas 88 and the microdams 92 are in the same plane.

The seal pattern illustrated in FIG. 3 shows a spiral groove pattern on the seal face, but other groove path patterns are also contemplated for use with this invention. For example, the grooves may be straight and disposed tangentially to the inner diameter circumference. Alternatively, the grooves may be disposed at various angles relative to the inner diameter circumference or different grooves may be disposed in a combination of angles.

Another preferred embodiment of the present invention is a seal face pattern which provides a surface with microdams in substantially the same plane and which further have only grooved surfaces between the microdam surfaces. FIG. 5 illustrates a ring 76' having a seal face pattern according to this embodiment where the groove portion 80' comprises a substantially greater radial dimension than the dam portion 82' than does the corresponding dimensions 80,82 of the embodiment illustrated in FIG. 3. This difference in relative radial dimension translates into a surface area of the annular grooved portion 80' which is significantly greater than the surface area of the annular dam portion 82'.

Another major difference from the embodiment of FIG. 3 is that the pattern of the embodiment of FIG. 5 lacks land areas, such as the land areas 88 illustrated in FIGS. 3 and 4. The surface of the groove portion 80' is effectively a lacework pattern of forwardly and rearwardly inclined spiral microdams 96 on a planar grooved surface. The spiral microdams 96 define polygonal surfaces such as the four-sided polygons 94, shaped substantially like diamonds, and three-sided polygons 98, shaped substantially like triangles. These surfaces are depressed or grooved areas which are below the plane of the microdam surfaces. The grooved polygonal surfaces 94 and 98 are at a depth of approximately 200–400 microinches, which is deeper than the groove depth of conventional grooves 70 of the ring 26 shown in FIG. 2. The depth of the various surfaces 94,98 may be uniform, but uniformity of the grooved surfaces is not necessary.

Another feature of the embodiment shown in FIG. 5 is the three-sided polygonal surfaces 98 at the edge of the seal face. These surfaces are defined by microdams 96 that form an oblique angle with the edge of the surface. It has been determined that if these surfaces 98 are not grooved but are in the same plane as the surface of the microdams 96 surfaces, then rotation of the ring in either the clockwise or the counterclockwise directions provides a greater capability of the ring to pump fluid from the edge of the ring where these surfaces are disposed toward the center of the annular grooved portion 80'. The pumped fluid then maintains an adequate stiffness and thickness to maintain the proper gap between the seal faces. Moreover, the microdam structure and polygonal four-sided surfaces 94 maintain a sealing capability which substantially reduces fluid leakage through the gap between the seal faces.

The width of the microdam 96 measured at the planar surface can be in a range of from about 0.001 to about 0.100 inches, with the preferable width being about 0.025 inches. As is discussed above, the grooved surfaces are at a depth of between about 50 to about 800 microinches with the preferable depth being approximately 350 microinches.

In a preferred embodiment, the ring material is tungsten carbide and the ring 76' is used as the rotating, mating ring, similar to ring 26 of the seal shown in cross section in FIG. 1 The grooved surfaces are produced by methods known to those skilled in the art.

FIG. 6A is an expanded cross-sectional view of the sealing ring 76' of FIG. 5. The cross-sectional view of FIG. 6A is expanded to provide a relative approximate plot of the pressure profile illustrated in FIG. 6B. FIGS. 6A and 6B are positioned one above the other so that there is a correspondence along the ordinate (X-axis) between the pressure profile of FIG. 6B and the radial position as taken from the inner diameter (I.D.) to the outer diameter (O.D.) of the ring shown in FIG. 5. It is to be understood that the pressure profile of FIG. 6B is only illustrative of the physical model of the ring 76' when in use. Because the separate polygonal grooved surfaces 94 are three-dimensional, it is not possible to represent in simple form the pressure profile of the grooved surface 94. Thus, the pressure profile of FIG. 6B is only an approximate rendering of a hypothetical cross-sectional slice taken through the ring 76'.

The pressure profile of FIG. 6B illustrates the relative pressures hypothetically taken at points along the surface of the ring 76'. The pressure at the inner diameter (I.D.) is atmosphere pressure, and is indicated by $P_{ATM}$. The pressure at the outer diameter (O.D.) is at the sealed pressure and is indicated by $P_{OD}$.

As in all conventional gap type seals, the fluid being sealed, located at the O.D. in this illustrative embodiment, leaks through the gap and over the surface of the ring from the high pressure, here the O.D., side toward the atmospheric ($P_{ATM}$) pressure, which is at the I.D. The fluid at the O.D. is impelled inwardly by the raised triangular ungrooved surfaces 98, in an entrance effect created by pumping action. Reference to FIG. 5 will show that there is an acute angle a between an edge 100 of the triangular surface and the circumference of the O.D. which ideally suits the intended "pumping" function of the surfaces 98. A preferred range of angles for a which will work with the arrangement are between 10° and 30°, and the preferred embodiment will have a angle a equal to about 15°. As the ring rotates, the leading edge of raised or offset surfaces 98 act as skimmers on the fluid at the high pressure side and pump or impel the fluid inwardly from the circumference.

Referring again to FIGS. 6A and 6B, the fluid being pumped from the O.D. reaches the first or outermost microdam 96 which acts as a fluid barrier. The relative pressure is greater at the point closest to the outer wall of the microdam 96. The pressure then drops across the barrier formed by the microdam 96 until the inner wall of the microdam defining the next grooved surface 94 is reached.

It is understood that each microdam 96 is at an acute angle to the tangent normal to a given radius which touches the circumference of the seal face at that given radius. Thus, the fluid in each of the grooved surfaces 94 is pumped inwardly by the microdams 96 as the ring 76' rotates and a slight increase in pressure results from the inward pumping. As each microdam 96 acts as a barrier, there is a corresponding pressure drop across each microdam 96. The relative pressure in the grooved surfaces 94 also decreases as the measurements are taken at a surface from close to the outer diameter toward one at the inner diameter. The pressure barriers resulting from step decreases, generated by the microdams 96 as is shown in the pressure profile of FIG. 6B, provides for a minimum of fluid leakage across the surface of the ring 76'.

As in conventional groove face seals, the dam portion 82' experiences the greatest pressure drop across the surface and allows the pressure to drop to atmospheric pressure $P_{ATM}$. The pressure drop across the dam 82' is smaller, however, because the step decreases have reduced the relative pressures between the outer wall formed by the dam 82' and the inner diameter. The decrease in the amount of pressure drop further reduces the amount of total fluid leakage from a seal utilizing the inventive microdam structure.

The fluid pressure analysis made above with regard to the embodiment shown in FIGS. 5 and 6A would be applicable also to seal face pattern as shown in the embodiment of FIGS. 3 and 4. The differences in the structure, e.g. the land surfaces 88 provided in the embodiment of FIGS. 3 and 4, allow for more of a channeling of the fluid flow in a spiral direction as rotation is begun of the ring 76 shown in FIGS. 3 and 4. Otherwise the microdams achieve the same function of providing a series of step decreases in the pressure as taken from the outer diameter toward the inner diameter.

The microdams also provide the capability for rotation of the sealing ring in either the clockwise or counterclockwise directions. The microdams not only build pressure at the barriers, but also restrict fluid flow, such as air flow, from the atmosphere side toward the high pressure side.

Of course, other alternative arrangements will become apparent to a person of ordinary skill in the art after acquiring a full understanding of the present invention. For example, the microdams can be utilized in unidirectional, spiral groove seal faces. Other changes, such as placing the spiral grooves on the stationary ring or placing the dams 82 or 82' at atmospheric pressure at the outer diameter and having the pumping surfaces 98 at the inner diameter, are also within the scope of this invention.

We claim:

1. In a gap-type, grooved face seal having a stationary sealing ring and a relatively rotating sealing ring with opposed radially extending faces, one of said rings being sealingly affixed to a housing and the other sealingly affixed to a shaft, the improvement comprising, in at least one of said rings, a seal face including:

a grooved portion having discontinuous grooved surfaces extending inwardly from one circumference of the face of at least one said ring, said grooved surfaces extending across the face of said ring in a discontinuous pattern and being defined by microdams extending between said grooved surfaces, said microdams being offset from the grooved surfaces and having a width at the outermost contacting surface which is significantly smaller than the width of the recesses formed by the grooved surfaces, said microdams being disposed along the boundary of each said grooved surface, whereby said discontinuous grooved surfaces essentially comprise a plurality of grooved polygonal surfaces disposed on the ring face adjacent each other with a microdam being disposed between each said grooved polygonal surface and any adjacent said grooved polygonal surface; and an ungrooved portion extending inwardly from the other circumference of the face of at least one said ring.

2. A seal as recited in claim 1 in which said grooved portion is an annular band which extends from the outside circumference of said face toward the center of said face.

3. A seal as recited in claim 1 in which said grooved portion is an annular band which extends from the inside circumference of said face toward the center of said face.

4. The seal according to claim 1 wherein said grooved surfaces further comprise a pattern of spiral grooves, a predetermined number of spiral grooves being defined and separated by a plurality of polygonal land surfaces disposed between two adjacent spiral grooves, each of said land surfaces being bounded by two pairs of immediately adjacent spiraling microdams and having a surface substantially in the plane of the offset microdam surfaces, one of said pair of adjacent microdams being rearwardly inclined and the other of said pair of adjacent microdams being forwardly inclined relative to the direction of shaft rotation.

5. The seal according to claim 4 wherein said lands are in a pattern defined by polygonal surface areas having alternating groove and land surfaces whereby each land surface in the plane of the face is completely surrounded by a plurality of grooved surfaces.

6. The seal as recited in claim 1 wherein the grooved portion further comprises grooved surfaces that define discontinuous spiral grooves extending inwardly from one circumference of the face of one of said rings in a spiral path, said discontinuous spiral grooves including microdams across said spiral path of said grooves, each said discontinuous spiral groove being separated from each adjacent discontinuous spiral groove by spiral shaped lands extending across the sealing face groove portion.

7. The seal as recited in claim 6 wherein said discontinuous spiral grooves are both forwardly and rearwardly inclined with respect to the direction of rotation of said sealing face, whereby said discontinuous spiral grooves define intersecting swaths across the surface of said groove portion, and said spiral shaped lands between said spiral grooves further comprise land area segments, said land area segments being spaced from each other and separated by said spiral grooves extending across said grooved surface in the other inclined direction from the direction in which the spiral shaped land is inclined, and further whereby said microdams extend from each of said land area segments to adjacent land area segments across said swaths formed by said discontinuous spiral grooves that are inclined both forwardly and rearwardly relative to rotation of the shaft.

8. The seal as recited in claim 7 wherein the surface defining said land area is at a height relative to said grooved surfaces which is substantially identical to the height of said microdam surfaces relative to said grooved surfaces.

9. The seal as recited in claim 8 wherein said height is in a range of from approximately 25 microinches to approximately 1500 microinches.

10. The seal as recited in claim 9 wherein said height is approximately 350 microinches.

11. The seal as recited in claim 10 wherein said microdams have widths of from about 0.001 to about 0.100 inches as measured at a microdam surface at the height offset from said grooves surfaces.

12. The seal as recited in claim 11 wherein said microdam widths are approximately 0.025 inches.

13. The seal as recited in claim 6 wherein the surface defining said land areas is at a height relative to said grooved surfaces which is substantially identical to the height of said microdam surfaces relative to said grooved surfaces.

14. The seal as recited in claim 1 and further comprising a plurality of entrance land areas disposed at said one circumference of the face, said entrance land areas being of a height relative to the surface of said grooved polygonal surface areas substantially equal to the height of said microdams, each said entrance land area being bounded by the circumference of said seal face and at least two microdams, whereby each said entrance land area is defined by at least one acute angle relative to a tangent at said circumference and whereby rotation of the said ring causes at least one said acute angle to form a leading edge which impels the fluid being sealed inwardly from said one circumference.

15. The seal as recited in claim 14 wherein said discontinuous spiral grooves are both forwardly and rearwardly inclined with respect to the direction of rotation of said sealing face and whereby said entrance land areas have a substantially triangular shape with two acute angles disposed relative to a tangent at the circumference, whereby rotation of the ring in one direction causes said one acute angle to form a leading edge and rotation of the ring in the opposite direction causes said other acute angle to form a leading edge, said leading edges being adapted to impel the sealed fluid inwardly from said one circumference.

16. The seal as recited in claim 15 wherein the surface defining said entrance land areas is at a height relative to said grooved surfaces which is substantially identical to the height of said microdam surface relative to said grooved surfaces, and said height is in a range of from approximately 25 microinches to approximately 1500 microinches.

17. The seal as recited in claim 16 wherein said height is approximately 350 microinches.

18. The seal as recited in claim 17 wherein said microdams have widths of form about 0.001 to about 0.100 inches as measured at a microdam surface at the height offset from said grooved surfaces.

19. The seal as recited in claim 18 wherein said microdam widths are approximately 0.025 inches.

20. A groove ring seal face for a mechanical end face seal, the seal for sealing a housing and a relatively rotating shaft, the seal face comprising:
an annular ungrooved dam portion extending inwardly from one circumference of the face of the ring; and
a grooved portion extending inwardly from the other circumference across the face of the ring, the grooved portion including grooves being forwardly and rearwardly inclined relative to the rotation of the shaft, the grooved portion including a plurality of lands between said grooves, said forwardly inclined grooves intersecting said rearwardly inclined grooves and defining first discrete areas of said grooved portion which are common to both type of grooves and second discrete areas associated with only one of said grooves, and further including microdams disposed between and separating said first discrete areas and said second discrete areas, said microdams being offset from the grooved surfaces and having a width at the outermost contacting surface which is significantly smaller than the width of the recesses formed by the grooved surfaces.

21. The groove arrangement according to claim 20 wherein said microdams further comprise surfaces being in the same plane as the surfaces defined by said lands.

22. The groove arrangement according to claim 21 wherein said microdams have widths of from about 0.001 to about 0.100 inches as measured at said plane containing said microdam surface.

23. The groove arrangement according to claim 22 wherein said widths of said microdams are approximately 0.025 inches.

24. In a groove seal having a stationary sealing ring and a primary sealing ring with opposed radially extending faces, one of said rings being sealingly affixed to a housing and the other affixed to a shaft, the improvement comprising:
a grooved portion having intersecting forwardly and rearwardly directed grooves, the surface areas of the intersection between said forwardly and rearwardly directed spiral grooves comprising a plurality of polygonal grooved surfaces, each polygonal grooved surface being circumscribed by a plurality of microdams, said microdams being offset from the grooved surfaces and having a width at the outermost contacting surface which is significantly smaller than the width of the recesses formed by the grooved surfaces, the microdams separating said groove intersecting areas from groove non-intersecting areas along common borderlines, said groove non-intersecting areas defining lands having plural groove non-intersecting areas adjacent all sides of said lands;
an ungrooved dam portion extending inwardly from the other circumference of the face of the ring.

25. A seal as recited in claim 24 in which said grooved portion extends from the outside circumference of said face toward the center of said face.

26. A seal as recited in claim 25 in which said grooved portion extends from the inside circumference of said face toward the center of said face.

27. The groove arrangement according to claim 24 wherein said microdams further comprise surfaces being in the same plane as the surfaces defined by said lands.

28. The groove arrangement according to claim 27 wherein said microdams have widths of from about 0.001 to about 0.100 inches as measured at said plane containing said microdam surface.

29. The groove arrangement according to claim 28 wherein said widths of said microdams are approximately 0.025 inches.

30. A groove arrangement for the face of one ring in a mechanical face seal, comprising:
an annular ungrooved dam portion extending inwardly from one circumference of the face of the ring; and
a microdam portion including a series of discrete intersecting forwardly and rearwardly inclined microdams extending inwardly from the other circumference of the face the ring, each said microdam having a surface in substantially the same plane as the other microdams, said microdams defining axially depressed polygonal surfaces in at least one plane different from the plane of the microdam surfaces.

31. The groove arrangement according to claim 30 wherein the plane of the microdam surfaces are at a height relative to said depressed polygonal surfaces, said height being in the range of about 25 microinches to about 1500 microinches.

32. The groove arrangement according to claim 31 wherein said height is approximately 350 microinches.

33. The groove arrangement according to claim 32 wherein said microdams are approximately 0.025 inches in width as measured at said microdam surface.

34. In a gap-type, grooved face seal having a stationary sealing ring and a relatively rotating sealing ring with opposed radially extending faces, one of said rings being sealingly affixed to a housing and the other sealingly affixed to a shaft, the improvement comprising, in at least one of said rings, a seal face including:

a grooved portion including grooved surfaces extending inwardly from one circumference of the face of at least one of said rings, said grooved surfaces extending across the face of said ring in a pattern being defined by lands extending between said grooved surfaces, said lands being offset from the grooved surfaces and being disposed across the face of said grooved portion, said lands further comprising entrance lands defined by having one edge of each said entrance land coinciding with the circumferential edge of said one circumference of the seal ring face, a radially extending edge of each said entrance land is forwardly inclined and another radially extending edge is rearwardly inclined relative to the direction of rotation of the seal ring, such that said forwardly and rearwardly inclined edges each define an intersecting angle with the circumferential edge of said seal ring relative to a tangent, each said intersecting angle being of from about 10 degrees to about 30 degrees, whereby said intersecting angle of each forwardly inclined radially extending edge of each said entrance land provides an entrance effect to said seal ring face upon rotation of the shaft in either direction; and an ungrooved portion extending inwardly from the other circumference of the face of said ring.

35. A seal as recited in claim 34 in which said grooved portion is an annular band which extends from the outside circumference of said face toward the center of said face.

36. A seal as recited in claim 34 in which said grooved portion is an annular band which extends from the inside circumference of said face toward the center of said face.

37. The seal according to claim 34 wherein said grooved portion further includes entrance lands wherein said intersecting angle is approximately 15 degrees.

38. The seal according to claim 35 wherein said grooved portion further includes entrance lands wherein said intersecting angle is approximately 15 degrees.

39. A seal face pattern for a ring in a mechanical end face seal, the seal for sealing a housing and a relatively rotating shaft, the seal comprising:

a generally planar surface extending inwardly from the inner circumference to the outer circumference of said ring, the surface including shallow grooves being forwardly and rearwardly inclined relative to the direction of rotation of the shaft, each said forwardly and rearwardly inclined groove being separated from the adjacent respective forwardly and rearwardly inclined grooves by microdams disposed along the periphery of said grooves, said microdams being in the generally planar surface defining said ring face, said microdams being offset from the grooved surfaces and having a width at the outermost contacting surface which is significantly smaller than the width of the recesses formed by the grooved surfaces, said forwardly inclined grooves intersecting said rearwardly inclined grooves, each said intersection defining a first discrete area substantially in the shape of a diamond being surrounded by said microdams.

40. The seal face pattern according to claim 39 wherein a set of successive alternate forwardly inclined grooves provide second discrete areas at the intersection with a set of successive alternate rearwardly inclined grooves, said second discrete areas being in the generally planar surface defining said ring face.

41. The seal face pattern according to claim 39 further comprising an ungrooved dam portion extending from one inner or outer circumference to a circumferential boundary on said generally planar surface, the grooves extending from the other said circumference to said circumferential boundary.

42. The seal face pattern according to claim 40 further comprising an ungrooved dam portion extending from one inner or outer circumference to a circumferential boundary on said generally planar surface, the grooves extending from the other said circumference to said circumferential boundary.

43. In a gap-type, grooved face seal having a stationary sealing ring and a relatively rotating sealing ring with opposed radially extending faces, one of said rings being sealingly affixed to a housing and the other sealingly affixed to a shaft, the improvement comprising, in at least one of said rings, a seal face including a grooved portion having discontinuous grooved surfaces extending inwardly from one circumference of the face of at least one said ring said grooved surfaces extending across the face of at least one said ring in a discontinuous pattern and being defined by microdams extending between said grooved surfaces, said microdams being offset from the grooved surfaces and having a width at the outermost contacting surface which is significantly smaller than the width of the recesses formed by the grooved surfaces, said microdams being disposed along the boundary of each said grooved surface, whereby said discontinuous grooved surfaces essentially comprise a plurality of grooved polygonal surfaces disposed on the ring face adjacent each other with a microdam being disposed between each said grooved polygonal surface and any adjacent said grooved polygonal surface.

* * * * *